(12) United States Patent
Mesh et al.

(10) Patent No.: US 8,325,403 B1
(45) Date of Patent: Dec. 4, 2012

(54) OPTICAL PROGRAMMABLE MATRIX PROCESSOR

(75) Inventors: Michael Mesh, Kfar Saba (IL); Michael Laor, Zichron Yaakov (IL); Alexander Zeltser, Netanya (IL)

(73) Assignee: Compass Electro-Optical Systems Ltd, Natanya (IL)

( * ) Notice: Subject to any disclaimer, the term of this patent is extended or adjusted under 35 U.S.C. 154(b) by 920 days.

(21) Appl. No.: 12/395,737

(22) Filed: Mar. 2, 2009

Related U.S. Application Data

(60) Provisional application No. 61/032,100, filed on Feb. 28, 2008.

(51) Int. Cl.
*G02F 3/00* (2006.01)
(52) U.S. Cl. ....................................................... 359/108
(58) Field of Classification Search .................. 359/107, 359/108; 712/1–10; 714/702
See application file for complete search history.

(56) References Cited

U.S. PATENT DOCUMENTS

| | | | |
|---|---|---|---|
| 4,630,308 A * | 12/1986 | Hongo | 382/198 |
| 4,697,247 A * | 9/1987 | Grinberg et al. | 708/191 |
| 5,267,183 A * | 11/1993 | Guilfoyle et al. | 708/191 |
| 5,321,639 A * | 6/1994 | Krishnamoorthy et al. | 708/7 |
| 5,432,722 A * | 7/1995 | Guilfoyle et al. | 708/191 |

OTHER PUBLICATIONS

Goncharenko, I; "Optical method of performing the operation of matrix multiplication" Proceedings of LFNM 2006. 8th International Conference on Laser and FiberOptical Networks Modeling (IEEE Cat. No. 06TH8874); Volume and Issue No. 1; pp. 219; Publication Date: 2006.*
F Yu Yu, F; "A digital optical processor for optical computing" Proceedings of SPIE, the international society for optical engineering Volume and Issue No. 963; pp. 446-454; Publication Date: 1989; ISSNIISBN: 0277786X 0277-786X.*

* cited by examiner

*Primary Examiner* — Alessandro Amari
*Assistant Examiner* — Tamara Y Washington
(74) *Attorney, Agent, or Firm* — Wilmer Cutler Pickering Hale and Dorr LLP

(57) ABSTRACT

A bit-matrix processor including a pair of optoelectronic matrices and a controller for causing the matrices to perform Boolean Matrix transforms to perform logical operations, wherein Boolean logical equivalents include logical AND to replace element-wise multiplication, and logical OR instead of summation. According to one embodiment, the processor includes an optical source matrix for receiving input binary data; a passive optical replicator for replicating a pattern on the optical source matrix and projecting it onto a Spatial Light Modulator (SLM); a database loading device for loading data onto the SLM thereby to perform logical AND with the optical source matrix data; an integrating device for integrating light from the SLM onto a photodiode matrix; and an output signal processing device.

16 Claims, 1 Drawing Sheet

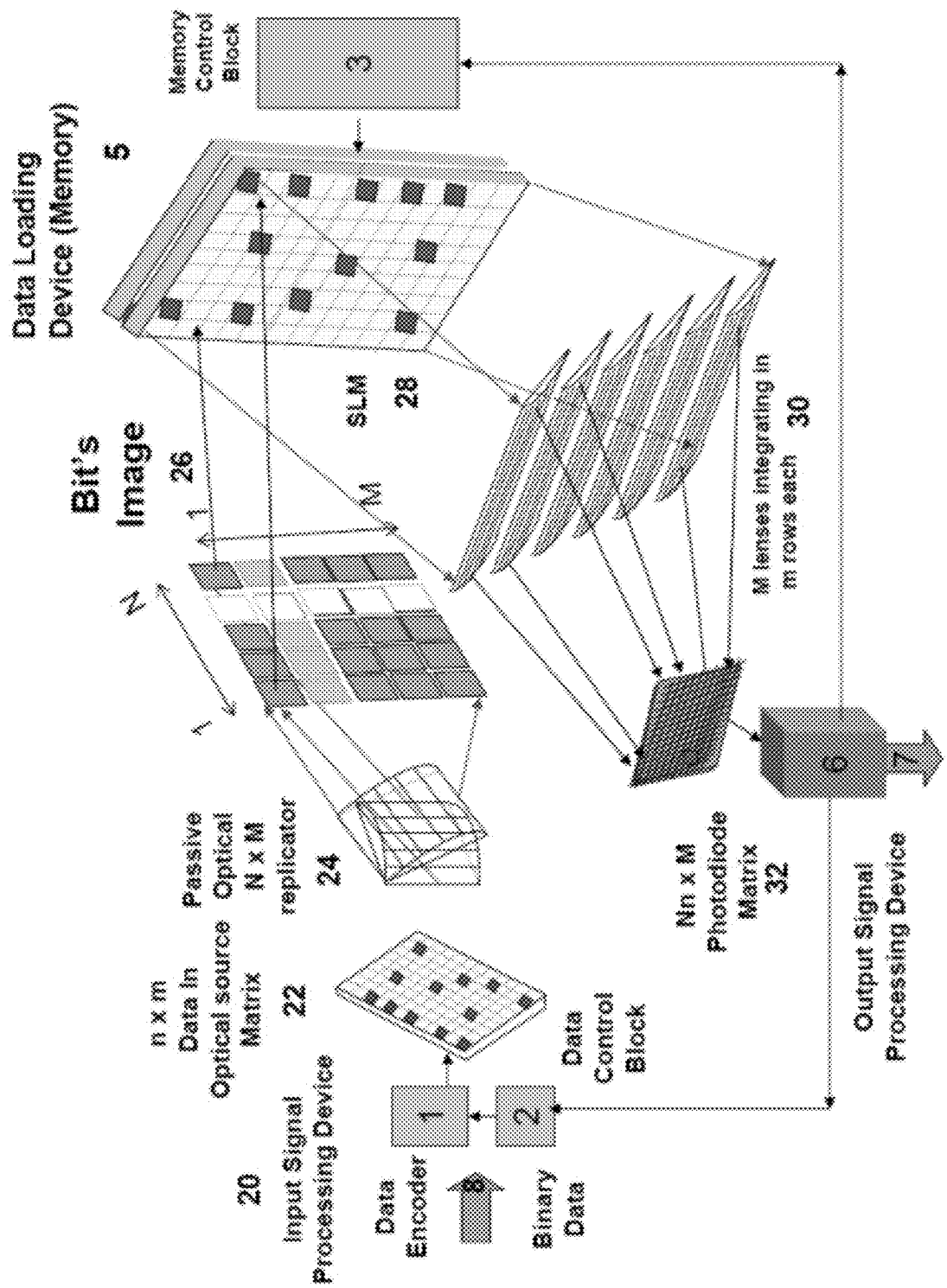

OPTICAL PROGRAMMABLE MATRIX PROCESSOR

FIELD OF THE INVENTION

The present invention relates to a programmable matrix processor, preferably an optical processor, and a method for processing therewith.

BACKGROUND OF THE INVENTION

Different architectures of processor devices are well known in the art. Matrix processors have advantages related to high parallelism, structure uniformity and possible scalability. Typically, conventional matrix processors consist of a plurality of electronic components, only, each designed to perform a different kind of operation (i.e., adder, multiplier, etc.) These components may be programmable arithmetical and logical units which utilize shared, usually concurrently accessible code and data memory resources with a small number of per unit fast registers and cache memories. Each such component can perform only one or a limited number of logical operations, which limits the applications which each such processor can implement. In the case of programmable devices, using software brings more flexibility. However, such devices are limited by speed (rate of processing). In addition, the use of shared resources may lead to starvation of processing units and decrease the rate of processing.

In order to increase the rate of processing, processors using optical components have been proposed. However, such devices are typically limited to one multiplication per time clock. While the rate of operation and parallelism could be high by using optics, operation of these devices is very specific. One such processor performs fast multiplication of a fixed size input vector on a slowly changing fixed size matrix, thus obtaining a fixed size resulting vector. The majority of existing embodiments of "optical" processors have the same (or similar) drawbacks: non-flexible processing data structure and very limited (unvarying or slowly varying) reprogramming capabilities.

Due to the structure of conventional optical processors with vector matrix multiplication architecture (one fixed length vector is multiplied on one fixed size matrix (which can be slowly updated)), these devices cannot perform the full range of logical operations or rotational shift of long strings with different lengths, permutation of bits in a string, correlation between different strings, etc.

Accordingly, there is a long felt need for a relatively simple device for performing matrix processing at high speeds and low power consumption that permits performance of correlation and logical functions on strings of data.

BRIEF DESCRIPTION OF THE DRAWINGS

The present invention will be further understood and appreciated from the following detailed description taken in conjunction with the drawing in which:

FIG. 1 is a block diagram illustration of a conceptual geometry of an optical setup for a matrix processor, according to a preferred embodiment of the invention.

SUMMARY OF THE INVENTION

The current invention relates to a programmable bit-matrix processor that performs a wide range of matrix Boolean operations by means of a simple data encoding scheme and a minimal set of basic logical operations and a method for performing such bit-matrix operations.

In particular, there is provided according to the present invention, a method for bit-matrix processing including performing at least one bit-matrix operation over at least one matrix, the step of performing including performing bit-wise logical AND between a replicated input bit-matrix and a preloaded operator bit-matrix of bigger size, and performing group-wise logical OR operations between the matrices after the step of logical AND.

There is also provided, according to the present invention, a method for method for bit-matrix processing including performing at least one bit-wise Boolean operation under at least two input matrices, by arranging input binary data in an operand matrix; arranging data from a memory in an operator matrix in an optoelectronic device; and performing element-wise AND and group-wise OR Boolean operations between the operand matrix and the operator matrix to perform the bit-wise Boolean operation.

According to one embodiment of the invention, the method further includes inputting binary data to an optical source matrix; loading data from a memory onto a Spatial Light Modulator (SLM); optically replicating a pattern from the optical source matrix and projecting it onto the SLM, thereby to perform bit-wise logical AND; integrating light from the SLM onto a photodiode matrix, thereby to perform group-wise logical OR; and processing an output signal from the photodiode matrix.

There is further provided, according to the present invention, a bit-matrix processor including an input bit-matrix serving as an operand matrix; an operator bit-matrix of larger or equal size than the input bit matrix, the operator bit-matrix being selected from at least one pre-loaded operator bit-matrix; a replicator for replicating the input bit-matrix onto the operator bit matrix; hardware for performing at least one bit-matrix operation over the input bit-matrix by the operator bit-matrix; the hardware being arranged to perform bit-wise logical AND between the replicated input bit-matrix and the preloaded operator bit-matrix of bigger size, and to perform group-wise logical OR operations between the matrices after performing the bit-wise logical AND.

According to a preferred embodiment of the invention, the operand matrix is an optical source matrix for receiving input binary data; the operator matrix is a passive optical replicator for replicating a pattern on the optical source matrix and projecting it onto a Spatial Light Modulator (SLM); and the processor further includes a database loading device for loading data onto the SLM thereby to perform logical AND with the optical source matrix data; an integrating device for integrating light from the SLM onto a photodiode matrix; and an output signal processing device.

DETAILED DESCRIPTION OF THE INVENTION

The present invention relates to an architecture for a bit-matrix processor based on Boolean matrix transformations. It will be appreciated that the term "matrix" as used herein may also refer to a vector or set of vectors, such that the matrix processor can perform matrix-matrix, matrix-vector and vector-vector operations. Referring to FIG. 1, there is shown a block diagram of a generic bit-matrix processor according to a preferred embodiment of the invention.

The bit-matrix processor includes a data encoder 1, a data control block 2, a memory control block 3, a passive optical element 24, a database loading device (memory) 5 and an output signal processing device or control block 6. Data encoder 1 interfaces between a data source 8 and an optical source matrix 22.

Data control block 2 manages the data encoder 1, performing the following functions: defining a segment of an incoming bit stream to operate on, determining an encoding scheme using specific codes; filling a matrix with specific patterns of bits; organizing, replicating or adding bits under specific rules. Thus, data control block 2 is responsible for input data encoding/decoding and feedback control of the data flow.

The bit patterns output by data encoder 1 are mapped on the optical source matrix 22 and are replicated by passive optical element 24. These patterns are organized and connected in the form of an n×m matrix. This matrix, produced by optical source matrix 22 and replicated, is used to illuminate the surface of an SLM (Spatial Light Modulator) 28. SLM 28 is coupled to a memory 5, and memory 5 is coupled to memory control block 3 (which controls addresses of data blocks which are read from memory 5 and are loaded to SLM 28). Memory control block 3 is responsible for processing flow, i.e., for determining which is the next operator (among those preloaded to the SLM memory 5 during programming of the processor) to be applied to the next portion of data (operand), according to the desired operation or as a result of the previous operation. The content of memory 5 used for the operator matrix, in general, may be partially updated during program flow by memory control block 3.

Output optical signals are reflected from the pixels of SLM 28, through an integrating optical element 30 and are received on a photodiode matrix 32. Optical signals, converted by the photodiode matrix 32 to electrical form, are processed in output control block 6, and are transmitted on an output interface 7 to a network or other medium. At the same time, after optional processing in output control block 6, these optical signals can be fed to the data control block 2 for additional processing, or to the memory control block 3 for loading new values on the SLM.

In a manner well-known in the art, a bit stream 8 is received from the physical medium at an input interface of data encoder 1. Data encoder 1 is operated by data control block 2 to determine the handling of incoming bits of data stream 8. Incoming bit stream 8 may include handling information that is used by data control block 2 (to determine bit stream structuring), by output control block 6 (to determine output bit stream destination) and by memory control block 3 (to determine uploading information from the memory). Data control block 2 may also include control information for output signal processing device 6 and memory control block 3.

Determining bit stream structuring (by data control block 2) may include determining the data portion of the bit stream 8 operated on by data control block 2. Operations performed by data control block 2 include one or more of the following:
  definition of a specific segment of incoming bit stream 8 and use of a segment of a specific size;
  encoding the input bit stream according to a specific algorithm;
  filling the optical source matrix with selected patterns of bits;
  organizing bits into a matrix of rows and columns of specific size and in a specific sequence;
  replicating or adding bits under specific rules.

The output bit stream destination determined by output control block 6 can be via an output data interface 7 to a network or media, or the data control block 2 for an additional cycle of processing.

Uploading of information is determined by memory control block 3. Operations performed by memory control block 3 include one or more of the following:
  specifying a segment of bits stored in memory 5 to be loaded into SLM 28;
  uploading of specific bits;
  uploading of specific patterns of bits.

The matrix processor, based on Boolean matrix transforming, operates by interaction between two matrices. A description of this interaction is provided below.

The basic Boolean matrix transformation performed by the processor of the present invention is:

$$R_b^{c,d} = \bigcup_{i=1}^{m} (C_{i,b}^{c,d} \& V^{i,b}); \quad \text{Equation 1}$$

$$\bigcup - \text{bitwise logical "OR"} \begin{cases} i = 1 \div m \\ b = 1 \div n \\ c = 1 \div M \\ d = 1 \div N \end{cases}$$

Here, V denotes an input (operand) matrix (after encoding and possible replication during the mapping procedure, as described below), while C is the operator (SLM) matrix. R is the result matrix that is obtained after optical integration and following thresholding. The result is always treated as an operation that is encoded in C under operand(s) which are mapped (after encoding) to V. In other words, this equation represents bit-wise logical AND followed by group-wise logical OR, which is carried out by the processor.

The basic building blocks of the operand are columns of the V matrix. The granularity of operand sizes (after encoding) is m. According to the distinct size of each input vector(s) (matrix), encoded data representing the input vector(s) may be replicated to fill the entire m×n V matrix. This procedure provides the possibility of utilizing an extra replication factor, in addition to the fixed replication factor inherent in the passive optical elements. As reflected in the following examples of operations, every column of the V matrix may contain appropriate parts (bits) of 1 or more vector-operands. Distribution of those parts along the operand matrix is controlled by data control block 2 and depends on any additional operation or operations that must be performed. This, in turn, may depend on the result of the previous operation or/and on static program flow.

The architecture of the present invention includes a single input matrix device (which includes data encoder 1, data control block 2, and optical source matrix 22), a passive optical element, in which an input matrix is replicated, and multiple processing units (which include SLM 28, memory 5 and memory control block 3, integrating optical element 30, photodiode matrix 32 and output control block 6), by which the replicated matrices are processed, and multiple replicated patterns are output. Preferably,
  1. All matrix elements are 1-bit (two levels of reflectivity).
  2. All logical elements are two-level devices, strongly resolving 0 and 1 logical levels of signal.
  3. Replicated data is represented in the form of a matrix, rather than in a vector form.
  4. Data can be encoded depending on the specific functionality required.
  5. In comparison to linear algebraic operations of vector-matrix multiplication, embodiments of the present invention use Boolean logical equivalents of vector-matrix operations. In particular, element-wise multiplication is substituted by logical AND, while logical OR replaces summation.

The processor of the invention operates on two matrices: one matrix received from data encoder 1 (and built from data stream 8 received from the network or the media), and one matrix received from memory 5.

The second matrix, which is formed by the SLM with the values uploaded from the memory 5, is defined as an Operator.

The matrix produced by data encoder 1 is defined as an operand or operands.

In the present invention, bit stream 8 is received from the network or media through a physical interface. This interface may take any form, depending on the physical medium of the network. Accordingly, the present invention is not limited to any particular type of media or protocol.

The present invention of matrix processor architecture is concerned with the processing of the received bits after they are extracted from the medium.

The bit stream initially enters data encoder 1. Data encoder 1 is employed to organize these bits in the Operand matrix of n columns with m bits in each column.

The Operand matrix is transmitted in parallel through the passive optical element (which actually is a replicator of N×M dimensions) and is replicated N×M times in this way. Due to the fact that N and M can be of different values (N, M≧1), different replication factors can be applied for both rows and columns. This means that the Operand matrix is rectangular, where each pair of parallel sides can have a different size.

Finally, these N×M numbers of n×m elements each, produced by the passive optical multiplier, are reflected on the SLM 28, consisting of one big matrix with Nn×Mm pixels. In this way, SLM 28 can act as a single, large operator, performing a single operation on the incoming data, or as a plurality of smaller operators, each performing an operation concurrently on the incoming data. In this case, the operations performed may be the same or may be different. The data loaded from memory 5 is selected by memory control block 3, depending on the exact operation which is desired. Each pixel pattern on the SLM 28, which is matrix of n×m elements, can be separately loaded with specific values from the local memories 5, as directed by the memory control block 3.

Light, reflected or not reflected from each pixel of SLM 28 (depending on the on-off status of the optical source and/or SLM pixel) is, actually, the result of a logical AND operation, produced by those optical source and SLM pixel values.

In the next stage, the light reflected from the SLM pixels goes through the integrating optical element 30, here illustrated as M lenses, which integrate the intensity of the light reflected from each group of m rows of the SLM, to set a matrix of N×M of the vectors, each of which is n bits long. After such integration, the light is received on the surface of the photo-detector matrix 32. Each photo detector or receiver is a hard-threshold device, strongly resolving 0 and 1 values of a signal. All receivers are organized in the form of a matrix 32.

Inside of matrix 32, control circuits are also provided to connect specific groups of neighboring photo-receivers so as to obtain logical functions, such as OR or NOR functions, as well as to process certain additional operations. The resulting signal consists of output data and control signals for output control block 6 and input control block 2.

Actually, this method of matrix organization provides very high flexibility for the matrix processor. This arrangement of hardware provides "filters" to select the desired data for use and processing.

As was mentioned above, the physical size of the SLM is fixed, which limits the size of the Operator matrix. The size of the Operator matrix is preset according to the specific operation the processor is to carry out. Similarly, the optical source matrix has a fixed size, although its corresponding input operand data may have variable size. Information can be loaded on the matrices in different ways-single bits, repeated bits and groups, bit patterns; all loaded by columns or rows, replicated fully or partially, etc. This means that input data can be partially replicated while being mapped to the optical source matrix followed by replication by means of passive optics. Thus, on the one hand, this means the number of matrix elements in the Operand times the replication factor cannot be larger than the Operator matrix size. On the other hand, the size of, and organization of, data in the Operand matrix remain flexible, and the replication factor can be adjusted, as necessary.

This combination of pre-set matrix configuration and dynamic data loading provides unprecedented flexibility of the matrix processor according to embodiments of the present invention for performing various logical matrix-matrix operations.

Operation of the processor will now be described. To obtain the results R, each SLM pattern of size n×m, performs bit wise logical AND operations between data that comes from data encoder 1 and a data set according to memory 5.

Formally, the sequence of operation can be depicted as:

$$R_b^{c,d} = \bigcup_{i=1}^{m} (C_{i,b}^{c,d} \& V^{i,b}); \bigcup - \text{bitwise logical "OR"} \quad \begin{cases} i = 1 \div m \\ b = 1 \div n \\ c = 1 \div M \\ d = 1 \div N \end{cases} \quad (1)$$

$$V = \begin{bmatrix} \circ & \circ & \cdots & \bullet & \bullet \\ \vdots & \vdots & \ddots & \vdots & \vdots \\ \bullet & \circ & \cdots & \circ & \bullet \end{bmatrix} \updownarrow m \quad C^{c,d} = \begin{bmatrix} \bullet & \circ & \cdots & \bullet & \circ \\ \vdots & \vdots & \ddots & \vdots & \vdots \\ \circ & \bullet & \cdots & \circ & \bullet \end{bmatrix} \updownarrow m$$
$$\leftarrow n \rightarrow \qquad \leftarrow n \rightarrow$$

$$C = \begin{bmatrix} m\overline{\{C^{1,1}}^n & m\overline{\{C^{1,2}}^n & \cdots & m\overline{\{C^{1,N-1}}^n & m\overline{\{C^{1,N}}^n \\ m\overline{\{C^{2,1}}^n & m\overline{\{C^{2,2}}^n & \cdots & m\overline{\{C^{2,N-1}}^n & m\overline{\{C^{2,N}}^n \\ \vdots & \vdots & \ddots & \vdots & \vdots \\ m\overline{\{C^{M-1,1}}^n & m\overline{\{C^{M-1,2}}^n & \cdots & m\overline{\{C^{M-1,N-1}}^n & m\overline{\{C^{M-1,N}}^n \\ m\overline{\{C^{M,1}}^n & m\overline{\{C^{M,2}}^n & \cdots & m\overline{\{C^{M,N-1}}^n & m\overline{\{C^{M,N}}^n \end{bmatrix} \updownarrow M$$
$$\leftarrow N \rightarrow$$

$$R = \begin{bmatrix} 1\{\overline{R^{1,1}}^n & 1\{\overline{R^{1,2}}^n & \ldots & 1\{\overline{R^{1,N-1}}^n & 1\{\overline{R^{1,N}}^n \\ 1\{\overline{R^{2,1}}^n & 1\{\overline{R^{2,2}}^n & \ldots & 1\{\overline{R^{2,N-1}}^n & 1\{\overline{R^{2,N}}^n \\ \vdots & \vdots & \ddots & \vdots & \vdots \\ 1\{\overline{R^{M-1,1}}^n & 1\{\overline{R^{M-1,2}}^n & \ldots & 1\{\overline{R^{M-1,N-1}}^n & 1\{\overline{R^{M-1,N}}^n \\ 1\{\overline{R^{M,1}}^n & 1\{\overline{R^{M,2}}^n & \ldots & 1\{\overline{R^{M,N-1}}^n & 1\{\overline{R^{M,N}}^n \end{bmatrix} \begin{matrix} \uparrow \\ \\ M \\ \\ \downarrow \end{matrix}$$

$$\leftarrow N \rightarrow$$

$$R^{c,d} = [\bullet \quad \circ \quad \ldots \quad \bullet \quad \circ]$$
$$\leftarrow n \rightarrow$$

Where V is the data matrix on the output of data encoder 1 and $C^{c,d}$ the multiple data matrices uploaded on each SLM pattern from memory 5.

Accordingly, $R^{c,d}$ is the result obtained after bit wise logical AND and following column wise OR operations on each SLM pattern.

Optionally (not shown in the expressions above), additional logical operations can be applied to each vector $R^{c,d}$ of n bits, if required. In this case, the same operation should be applied to all the vectors.

It will be appreciated that vector length, the vector replication factor and group size of the group-wise logical OR are selected according to a pre-selected size of the input-output vectors/matrices and the particular operation to be performed.

The proposed matrix processor has strong advantages, namely it is programmable and can operate dynamically with a set of different vector/matrix sizes without loss of efficiency and without increasing the number of long interconnects for longer vector lengths.

In a preferred embodiment, architectures of a Boolean Matrix parallel processor are realized optically, by using electro-optical components. This processor includes three main optoelectronic devices, all of which are known in the art:
  Optical Source matrix
  SLM matrix
  Photo Detector matrix
In order to achieve the desired bit-matrix processor architecture, it is preferred in the current invention that:
1. All optoelectronic elements are 1-bit resolution (two-level) devices.
2. The photo detector or receiver is a hard-threshold device, strongly resolving 0 and 1 values of a signal.
2. Replicated data is represented in the form of two-dimensional patterns.
3. Data is encoded to simplify the optical signal logical discrimination.
4. Operation of numerical matrix multiplication is replaced by its logical equivalent, where element-wise multiplication is substituted by logical AND, then summation turns into logical OR, correspondingly.

A short description of the principles of operation of this embodiment of the bit-matrix processor follows, with further reference to FIG. 1.

A digital input signal comes to the optical source 22 from an input signal processing device 20 (including data encoder 1 and control block 2).

The optical source 22 is the n×m matrix (for example, a VCSELs matrix) switched on for "1" and off for "0" to produce an "image" of bright and dark pixels. This is the Operand Matrix.

A passive optical element 24 horizontally replicates this matrix image in a row of N images. Passive optical element 24 vertically replicates this row M times to obtain an N×M matrix 26 of n×m images. Note that the same optical element may be used to replicate the image horizontally and vertically. For example, it can be a micro-lens array.

The replicated image illuminates a Spatial Light Modulator (SLM) 28 (whose size is Nn×Mm elements). Each pixel of SLM 28 is set to value "1" or "0", which means reflects or does not reflect illumination light. This value is uploaded from memory 5 and is addressed by the memory control block 3. Thus, the image reflected from each pixel of the SLM is actually a result of a bit-wise AND logical operation.

The image reflected from SLM 28 is passed through integrating optical element 30 in the form of M optical signal collecting elements, such as adders, lenses or other alternative solutions. Each of these optical signal collecting elements 30 integrates light of m pixels height. This means, each element 30 integrates the signals from m rows of images coupled together. The resulting image is focused on a photodiode matrix 32 for further electronic processing.

Optoelectronic implementation of the proposed device and method has three main advantages:
  1. Minimizes optical crosstalk.
  2. Provides an opportunity to operate dynamically with a set of different vector/matrix sizes without loss of efficiency and without increasing crosstalk for longer vector lengths, in the case of vector-matrix multiplication.
  3. Optical image replication and subsequent light integration are provided by means of passive optics. Thus, there is no need for additional energy to produce these operations. Such optical operations are performed at the speed of light, in a multi-channel, parallel and very efficient manner.

Despite relatively simple binary signal representation and use of only 2-level intensity modulation, such a processor functionally uses logical operations to perform a wide range of unary, binary, ternary, bit-vector and bit-matrix operations and manipulations:
  Any sort of bit permutation within bit vector or bit matrix. In particular, bitwise vector or matrix shift and rotation.
  Using Dual-Rail encoding ("0"→"01"; "1"→"10"), one can add any number of bit inversions to a permuted vector or matrix.
  Radix transform from Dual-Rail radix-2 numbers to radix-2^k "one from 2^k" encoded presentation (including multi-radix-2^k) and vice versa.
  Any kind of binary (vector-vector, matrix-matrix or vector-matrix) bitwise operations.

All these manipulations can be performed with a minimal number of programmable/nonprogrammable electronic logic elements, i.e., all massive parallel data manipulations are provided in passive optics, so electronic elements for processing in parallel a large number of input data-bits are not required. Thus, local (per pixel at SLM site) or "almost" local (commutating only nearest neighbors at source and detector site) (that is, the smallest number of elements, e.g., gates, in the desired location on the matrix) are sufficient. Use of this minimal number of electronic elements provides the possibility to increase the bit rate of the system, leverage the high optical bus capacity, thus providing a high degree of scalability required for different logical operations.

For different logical operations, different input signal encoding can be used. This means the Operator will be optimized for use with a specific Operand or plurality of Operands.

Input Signal Encoding

A sample table of one preferred form of signal encoding is presented in Table 1. "Dual-Rail Value" means the signal encoded on the optical source. Two bits are used to encode each incoming bit of signal. This scheme is named Dual-Rail or 1→2 encoding scheme.

TABLE 1

| Bit value | Dual-Rail Value |
|---|---|
| '0' | 01 |
| '1' | 10 |

A sample of encoded signals utilizing Table 1 is presented in Table 2.

TABLE 2

| Data | Encoded Data |
|---|---|
| 1011 | 10011010 |
| 0101 | 01100110 |
| 0011 | 01011010 |
| 1110 | 10101001 |

In some cases, it can be helpful to use another encoding scheme: 2→4 instead of 1→2. Dealing with the same number of bits, this scheme uses fewer active elements (i.e., optical sources) and gives, consequently, less optical crosstalk on the receiver side. For many applications, this can be important. Examples of this 2→4 encoding are shown in Table 3 and Table 4, where "Data" means optical source data ("1"—"light", "0"—"no light") and "Key" means corresponding SLM gate state ("1"—"reflects", "0"—"not reflects").

TABLE 3

| Two-Bit Value | Key | Data |
|---|---|---|
| 00 | 1110 | 0001 |
| 01 | 1101 | 0010 |
| 10 | 1011 | 0100 |
| 11 | 0111 | 1000 |
| 0x | 1100 | 0011 |
| 1x | 0011 | 1100 |
| x0 | 1010 | 0101 |
| x1 | 0101 | 1010 |
| xx | 0000 | 1111 |

TABLE 4

| Data Base Key value | 2 -> 4 Encoded Key value |
|---|---|
| 0100 | 11011110 |
| 100x | 10111100 |
| 1010 | 10111011 |
| 1100 | 01111110 |
| 1101 | 01111101 |
| 1110 | 01111011 |
| 111x | 01110011 |
| 1xxx | 00110000 |

EXAMPLES

An example of the logical operation of bit-wise vector inversion by using the matrix processor described above, with an encoding scheme, is as follows. In the following examples, a 1→2 encoding scheme, according to Table 1 and Table 2, is used.

Suppose that the initial vector is 1110. The encoded vector, according to Table 2, is 10101001. Inverted vector should be received as 01010110.

The initial vector can be presented as:

$$\begin{array}{|c|} \hline 1 \\ \hline 0 \\ \hline 1 \\ \hline 0 \\ \hline 1 \\ \hline 0 \\ \hline 0 \\ \hline 1 \\ \hline \end{array}$$

and the transformed vector, mapped on an optical source matrix 22 (of FIG. 1) is:

$$\begin{array}{|c|c|} \hline 1 & 1 \\ \hline 0 & 0 \\ \hline 1 & 0 \\ \hline 0 & 1 \\ \hline \end{array}$$

After replication by passive optical element 24, the input matrix Operand 26 will be represented by the following matrix:

$$\begin{array}{|cccc|cccc|} \hline 1 & 1 & 1 & 1 & 1 & 1 & 1 & 1 \\ 0 & 0 & 0 & 0 & 0 & 0 & 0 & 0 \\ 1 & 0 & 1 & 0 & 1 & 0 & 1 & 0 \\ 0 & 1 & 0 & 1 & 0 & 1 & 0 & 1 \\ \hline 1 & 1 & 1 & 1 & 1 & 1 & 1 & 1 \\ 0 & 0 & 0 & 0 & 0 & 0 & 0 & 0 \\ 1 & 0 & 1 & 0 & 1 & 0 & 1 & 0 \\ 0 & 1 & 0 & 1 & 0 & 1 & 0 & 1 \\ \hline \end{array}$$

It is assumed that SLM 28 has been programmed in the following form by memory control block 3 (where a white point means that light will be reflected from the pixel surface of the SLM), which is the appropriate pre-loaded operator bit matrix for the bit-wise vector inversion operation.

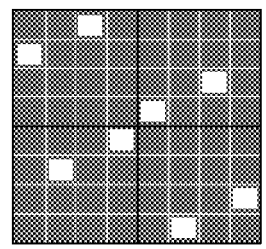

In this case, light from the optical source matrix reflected from the SLM will have the form:

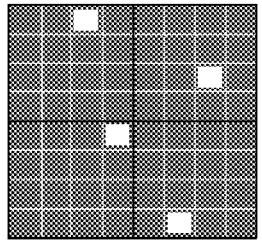

After optical integration of the lights from each column, consisting of one pixel from each of the 4 rows, the photodiode matrix signal is:

| 0 | 0 | 1 | 0 | 0 | 0 | 1 | 0 |
|---|---|---|---|---|---|---|---|
| 0 | 0 | 0 | 1 | 0 | 1 | 0 | 0 |

Finally, after the last stage of electronic integration (pair-wise neighbor photo-receivers performing logical OR), the signal will be presented in the form:

| 0 | 1 | 0 | 1 |
|---|---|---|---|
| 0 | 1 | 1 | 0 | which means that the resulting vector is 01010110 and the required result of vector inversion has been obtained.

Similarly, other mathematical operations may be performed using the optical programmable processor of the present invention. Examples of some other operations, including bit permutation, bit vector shift and bit rotation and others, are presented below. It will be appreciated that the particular operation carried out is controlled by memory control block 3, which determines the programming of SLM 28. In particular, output signal processing device 6 controls post processing of the resulting data. This may be in accordance with operand size and encoding scheme chosen, and provides control of any further data processing flow, as a function of the previous operation results.

Bit Logic Operations Examples: Bit Permutation, Bit-Vector Shift and Rotation Input: (column) bit-vector $V_{in} = \{v_0^{in}, v_1^{in} \ldots, v_{N-1}^{in}\}$, where $$v_k^{in} = \begin{cases} 0 \\ 1 \end{cases} \text{ for any } k = 0, 1, \ldots N-1$$

SLM matrix: $M = \{m_{i,k}\}$;

$$m_{i,k} = \begin{cases} 0 \\ 1 \end{cases} \text{ for any } i, k = 0, 1, \ldots N-1.$$

Output: (row) bit vector $V_{out} = \{v_0^{out}, v_1^{out}, \ldots, v_{N-1}^{out}\}$. Bit permutation means that every output bit $v_k^{out} = v_{I(k)}^{in}$, where $I(k)$ is the k-th element of a permutation-vector of integers from 0 to N−1. In particular, K-times rotation corresponds to $I(k) = (k+K) \mod N$, for the left rotation, and $I(k) = (N+k-K) \mod N$, for the right rotation, correspondingly. Shift assumes that first K mod N (right shift) or last (N−K)mod N (left shift) bits of the output vector are zero padded. The structure of the SLM matrix is as follows:

In the case of permutation/rotation: k-th row contains "1" only in I(k)-th position Shift: first K mod N (right shift) or last (N−K) mod N (left shift) rows contain only "0".

In the embodiment of FIG. 1, the operations after the photo receivers are carried out electronically.

Examples of some bit wise logical operations are shown below.

Bitwise Logical Operations

The most suitable data representation for bit-wise logic corresponds to Dual-Rail encoding: true(1)=(10); false(0)=(01). Thus, bit vector $v_0 v_1, \ldots v_{N-1}$ is transformed to Dual-Rail vector $v_0 \overline{v_0} v_1 \overline{v_1} \ldots v_{N-1} \overline{v_{N-1}}$, where $\overline{v_k}$=not $v_k$-logical negation Unary Negation (2-Bit Example):

With decoding:

$$\begin{vmatrix} v_0 \\ v_1 \end{vmatrix} \xrightarrow{electronic} \begin{vmatrix} v_0 \\ \overline{v_0} \\ v_1 \\ \overline{v_1} \end{vmatrix} \xrightarrow[\times]{optic} \begin{vmatrix} 0 & 0 \\ 1 & 0 \\ 0 & 0 \\ 0 & 1 \end{vmatrix} \xrightarrow{optic} = | \overline{v_0} \;\; \overline{v_1} |$$

Without decoding:

$$\begin{vmatrix} v_0 \\ v_1 \end{vmatrix} \xrightarrow{electronic} \begin{vmatrix} v_0 \\ \overline{v_0} \\ v_1 \\ \overline{v_1} \end{vmatrix} \xrightarrow[\times]{optic} \begin{vmatrix} 0 & 1 & 0 & 0 \\ 1 & 0 & 0 & 0 \\ 0 & 0 & 0 & 1 \\ 0 & 0 & 1 & 0 \end{vmatrix} \xrightarrow{optic} = | \overline{v_0} \;\; v_0 \;\; \overline{v_1} \;\; v_1 |$$

It should be noted, that it is possible to produce signal decoding optically, simultaneously with bitwise logical operations.

Bitwise Disjunction (a|b) (2 2-Bit Vectors Example)

$$\begin{vmatrix} a_0 \\ a_1 \\ b_0 \\ b_1 \end{vmatrix} \xrightarrow{electronic} \begin{vmatrix} a_0 \\ \overline{a_0} \\ a_1 \\ \overline{a_1} \\ b_0 \\ \overline{b_0} \\ b_1 \\ \overline{b_1} \end{vmatrix} \xrightarrow[\times]{optic} \begin{vmatrix} 1 & 0 \\ 0 & 0 \\ 0 & 1 \\ 0 & 0 \\ 1 & 0 \\ 0 & 0 \\ 0 & 1 \\ 0 & 0 \end{vmatrix} \xrightarrow{optic} = | (a_0 | b_0) \;\; (a_1 | b_1) |$$

Bitwise Disjunction with Inversion(a|(not b)) (2 2-Bit Vectors Example)

$$\begin{vmatrix} a_0 \\ a_1 \\ b_0 \\ b_1 \end{vmatrix} \xrightarrow{electronic} \begin{vmatrix} a_0 \\ \overline{a_0} \\ a_1 \\ \overline{a_1} \\ b_0 \\ \overline{b_0} \\ b_1 \\ \overline{b_1} \end{vmatrix} \xrightarrow{optic}{\times} \begin{vmatrix} 1 & 0 \\ 0 & 0 \\ 0 & 1 \\ 0 & 0 \\ 0 & 0 \\ 1 & 0 \\ 0 & 0 \\ 0 & 1 \end{vmatrix} \xrightarrow{optic}{=} |(a_0 | \overline{b_0}) \quad (a_1 | \overline{b_1})|$$

—conjunction—(a & b)

$$\begin{vmatrix} a_0 \\ a_1 \\ b_0 \\ b_1 \end{vmatrix} \xrightarrow{electronic} \begin{vmatrix} a_0 \\ \overline{a_0} \\ a_1 \\ \overline{a_1} \\ b_0 \\ \overline{b_0} \\ b_1 \\ \overline{b_1} \end{vmatrix} \xrightarrow{optic}{\times} \begin{vmatrix} 0 & 0 \\ 1 & 0 \\ 0 & 0 \\ 0 & 1 \\ 0 & 0 \\ 1 & 0 \\ 0 & 0 \\ 0 & 1 \end{vmatrix} \xrightarrow{optic}{=}$$

$$|(\overline{a_0} | \overline{b_0}) \quad (\overline{a_1} | \overline{b_1})| \xrightarrow{electronic}{not(negation)} |(a_0 \& b_0) \quad (a_1 \& b_1)|$$

—modulo 2 addition (logical XOR)—(a^b)

$$\begin{vmatrix} a_0 \\ a_1 \\ b_0 \\ b_1 \end{vmatrix} \xrightarrow{electronic} \begin{vmatrix} a_0 \\ \overline{a_0} \\ a_1 \\ \overline{a_1} \\ b_0 \\ \overline{b_0} \\ b_1 \\ \overline{b_1} \end{vmatrix} \xrightarrow{optic}{\times} \begin{vmatrix} 1 & 0 & 0 & 0 \\ 0 & 1 & 0 & 0 \\ 0 & 0 & 1 & 0 \\ 0 & 0 & 0 & 1 \\ 0 & 1 & 0 & 0 \\ 1 & 0 & 0 & 0 \\ 0 & 0 & 0 & 1 \\ 0 & 0 & 1 & 0 \end{vmatrix} \xrightarrow{optic}{=}$$

$$|(a_0|\overline{b_0}) \quad (\overline{a_0}|b_0) \quad (a_1|\overline{b_1}) \quad (\overline{a_1}|b_1)| \xrightarrow{electronic}{not(negation)} \to \to$$

$$|\underbrace{(\overline{a_0} \& b_0) \quad (a_0 \& \overline{b_0})}_{Group_0} \quad \underbrace{(\overline{a_1} \& b_1) \quad (a_1 \& \overline{b_1})}_{Group_1}| \xrightarrow{electronic}{Group\ OR} \to$$

$$|(a_0 \wedge b_0) \quad (a_1 \wedge b_1)|$$

One example of a complex logical vector function of many vector variables is presented below.

$$\begin{vmatrix} a_0 \\ a_1 \\ b_0 \\ b_1 \\ c_0 \\ c_1 \\ d_0 \\ d_1 \end{vmatrix} \xrightarrow{electronic} \begin{vmatrix} a_0 \\ \overline{a_0} \\ a_1 \\ \overline{a_1} \\ b_0 \\ \overline{b_0} \\ b_1 \\ \overline{b_1} \\ c_0 \\ \overline{c_0} \\ c_1 \\ \overline{c_1} \\ d_0 \\ \overline{d_0} \\ d_1 \\ \overline{d_1} \end{vmatrix} \xrightarrow{optic}{\times} \begin{vmatrix} 1&0&0&0&0&0&0&0 \\ 0&1&0&0&0&0&0&0 \\ 0&0&0&0&1&0&0&0 \\ 0&0&0&0&0&1&0&0 \\ 0&1&0&0&0&0&0&0 \\ 1&0&0&0&0&0&0&0 \\ 0&0&0&0&1&0&0&0 \\ 0&0&0&0&1&0&0&0 \\ 0&0&1&0&0&0&0&0 \\ 0&0&0&1&0&0&0&0 \\ 0&0&0&0&0&0&1&0 \\ 0&0&0&0&0&0&0&1 \\ 0&0&0&1&0&0&0&0 \\ 0&0&1&0&0&0&0&0 \\ 0&0&0&0&0&0&0&1 \\ 0&0&0&0&0&0&1&0 \end{vmatrix} \xrightarrow{optic}{=} \to \to \xrightarrow{optic}{=}$$

$$|\underbrace{a_0|\overline{b_0} \quad \overline{a_0}|b_0 \quad c_0|\overline{d_0} \quad \overline{c_0}|d_0}_{Group0} \quad \underbrace{a_1|\overline{b_1} \quad \overline{a_1}|b_1 \quad c_1|\overline{d_1} \quad \overline{c_1}|d_1}_{Group0}| \xrightarrow{electronic}{not}\ (negation)$$

$$\to \to |\underbrace{\overline{a_0} \& b_0 \quad a_0 \& \overline{b_0} \quad \overline{c_0} \& d_0 \quad c_0 \& \overline{d_0}}_{Group_0}$$

$$\underbrace{\overline{a_1} \& b_1 \quad a_1 \& \overline{b_1} \quad \overline{c_1} \& d_1 \quad c_1 \& \overline{d_1}}_{Group_1} \xrightarrow{electronic}{Group\ OR} \to \to$$

$$|(a_0 \wedge b_0) | (c_0 \wedge d_0) \quad (a_1 \wedge b_1) | (c_1 \wedge d_1)|$$

This is a function of four 2-bit vector variables: (a XOR b) OR (c XOR d).

Actually, this means that the processor of the present invention can perform a plurality of parallel operations on a plurality of input bit vectors of different lengths. In the example above, if other operations (different columns in the matrix) on the same set of bit vectors are added, another logical function of four variables can be calculated simultaneously. In other words, it is possible to add additional operands for simultaneous logical operations on the operator (here, 4 variables instead of only 2 variables, as in the examples above).

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A method for bit-matrix processing comprising:
    performing at least one bit-matrix operation over at least one matrix using an optoelectronic bit matrix processor;
    said performing at least one bit-matrix operation comprising:
        replicating an input bit-matrix to obtain a replicated input bit-matrix,
        performing bit-wise logical AND operations between said replicated input bit-matrix and a preloaded operator bit-matrix of bigger size to obtain an intermediate matrix; and
        performing group-wise logical OR operations between groups of elements of said intermediate matrix after said performing bit-wise logical AND operations.

2. The method according to claim 1, wherein at least one of said replicated input bit-matrix or said preloaded operator bit-matrix of bigger size is a vector.

3. The method according to claim 1, further comprising:
selecting a replication factor and a group size of said group-wise logical OR according to a pre-selected size of at least one of said input-bit matrix, said replicated input bit-matrix, said preloaded operator bit-matrix of bigger size or said intermediate matrix and the bit-matrix operation.

4. The method according to claim 1, further comprising encoding said input bit-matrix before said performing bit-wise logical AND operations.

5. The method according to claim 4, wherein said encoding said input bit-matrix comprises dual rail encoding.

6. The method according to claim 1, wherein said performing bit-wise logical AND operations is carried out using one or more optical elements.

7. A method for bit-matrix processing comprising:
performing, using an optoelectronic bit matrix processor, at least one bit-wise Boolean operation under at least two input matrices, by:
arranging input binary data in an operand matrix;
arranging data from a memory in an operator matrix in an optoelectronic device;
pre-setting a configuration of said operator matrix and dynamically loading said input binary data in said operand matrix; and
performing element-wise AND operations and group-wise OR Boolean operations between said operand matrix and said operator matrix to perform said bit-wise Boolean operation.

8. A method for bit-matrix processing comprising:
inputting binary input data to an optical source matrix;
loading data from a memory onto a spatial light modulator;
optically replicating data from said optical source matrix and projecting it onto said spatial light modulator according to a replication factor, thereby to perform bit-wise logical AND operations;
integrating light from said spatial light modulator onto a photodiode matrix, thereby to perform group-wise logical OR operations; and
processing an output signal from said photodiode matrix, wherein said spatial light modulator has a pre-set physical size, and said optical source matrix has a fixed size on which corresponding binary input data of variable size is mapped.

9. The method according to claim 8, further comprising encoding said binary input data.

10. The method according to claim 9, wherein said encoding said binary input data includes dual rail encoding.

11. A bit-matrix processor comprising:
an input bit-matrix serving as an operand matrix;
an operator bit-matrix of larger or equal size than said input bit matrix;
a replicator for replicating said input bit-matrix onto said operator bit matrix;
hardware arranged to perform bit-wise logical AND operations between said replicated input bit-matrix and said operator bit-matrix to obtain a intermediate matrix, and to perform group-wise logical OR operations between groups of elements of said intermediate matrix after performing said bit-wise logical AND operations.

12. The bit-matrix processor according to claim 11, wherein:
said operator bit-matrix includes an optoelectronic operator matrix;
said input bit-matrix includes an optoelectronic operand matrix; and
said hardware includes a memory controller for controlling processing flow and selecting at least one Boolean bit-wise logical operation to perform between parts of said operator matrix and said operand matrix for carrying out a desired matrix transform.

13. The processor according to claim 11, further comprising
a memory coupled to said operator matrix and including preloaded content for performing said Boolean bit-wise logical operations; and
a memory controller for selecting content from said memory and loading it in said operator matrix;
a data controller coupled to said operand matrix for dynamically loading input data into said operand matrix.

14. The processor according to claim 11, wherein:
said operand matrix is an optical source matrix for receiving input binary data;
said operator matrix is a passive optical replicator for replicating a pattern on said optical source matrix and projecting it onto a Spatial Light Modulator (SLM);
and further comprising:
a database loading device for loading data onto said SLM thereby to perform logical AND operations with said optical source matrix data;
an integrating device for integrating light from said SLM onto a photodiode matrix; and
an output signal processing device.

15. The processor according to claim 14, further comprising a data encoder for encoding said input binary data onto said operand matrix.

16. The processor according to claim 11, wherein all matrix elements are 1-bit representative of two levels of reflectivity and all logical elements are two-level devices, capable of resolving 0 and 1 logical levels of signal.

* * * * *